Feb. 20, 1940.  H. SAUER ET AL  2,191,414
EXPOSURE METER
Filed Feb. 2, 1938  2 Sheets-Sheet 1

Inventors
Hans Sauer
Paul Görlich
by B. Singer
Attorney

Patented Feb. 20, 1940

2,191,414

UNITED STATES PATENT OFFICE 2,191,414

EXPOSURE METER

Hans Sauer and Paul Görlich, Dresden, Germany, assignors to Zeiss Ikon Aktiengesellschaft, Dresden, Germany Application February 2, 1938, Serial No. 188,274
In Germany January 13, 1937

12 Claims. (Cl. 88—23)

This invention relates to improvements in exposure meters, and particularly to improvements in exposure meters permanently combined with photographic cameras.

It is an object of the invention to increase the sensitiveness of the meter by utilization of a reflecting galvanometer as a part of the exposure meter.

It is furthermore an object of the invention to facilitate the reading of the indicating beam by lengthening the path of the indicating beam between the movable mirror of the galvanometer and the translucent screen on which the position of the indicator beam can be observed.

It is furthermore an object of the invention to reduce the volume of the instrument by deflecting the path of light between the point of entry in the instrument and the movable mirror of the galvanometer, whereby the galvanometer mirror may be positioned out of line with the inlet opening for the light, and whereby an optical element for focusing the light may be inserted between the inlet opening and the mirror of the galvanometer.

It is furthermore an object of the invention to render beam deflecting means adjustable in order to cause the beam to appear on a predetermined point of a translucent screen on which it is to be observed, and to combine the adjustable deflecting means with means for controlling the exposure.

It may, therefore, also be described as an object of the invention to combine a beam regulating means with an exposure control means of the camera, whereby upon the appearance of the beam at a predetermined point of the translucent screen, indication is furnished that the control means for the exposure has been adjusted to the desired position.

With these and numerous other objects in view, an embodiment of the invention has been described by way of example in the following specification and shown in the accompanying drawings to which reference is made in the specification.

Figure 1:
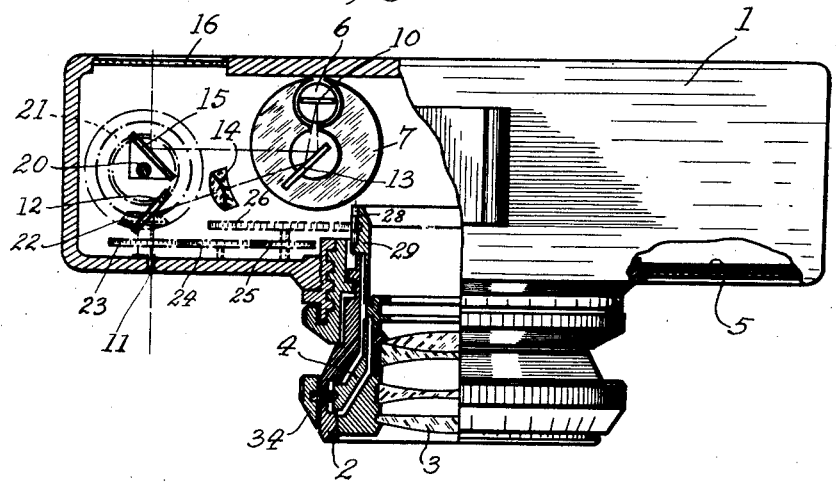
Fig. 1 is partly a top plan view and partly a horizontal section through a camera combined with an exposure meter and mirror galvanometer.

In the embodiment illustrated by way of example, the exposure meter is shown as being combined with the housing 1 of a camera. The latter has a mounting 2 preferably detachable, for a suitable lens 3, and is also provided with exposure control means, as for instance, a diaphragm ring 4 through which the effective aperture of the lens 3 may be varied as demanded by the light conditions and other conditions for the exposure. The diaphragm itself is not shown in the drawing.

The means for focal adjustment of the lens 3 may be constructed in any desired way and do not form any part of the present invention. Similarly also, the construction of the diaphragm may be selected as desired, and no claim is made to the specific construction of these parts.

The exposure meter illustrated by way of example also is of the known current generating type in which the light striking a photosensitive cell energizes said cell to produce an electric current, the intensity of which depends upon the strength of illumination. The intensity of this current may be determined by a galvanometer within the circuit. Devices of this type are now generally known and are frequently employed either in fixed association with the camera itself or detached from the camera.

Figure 2:
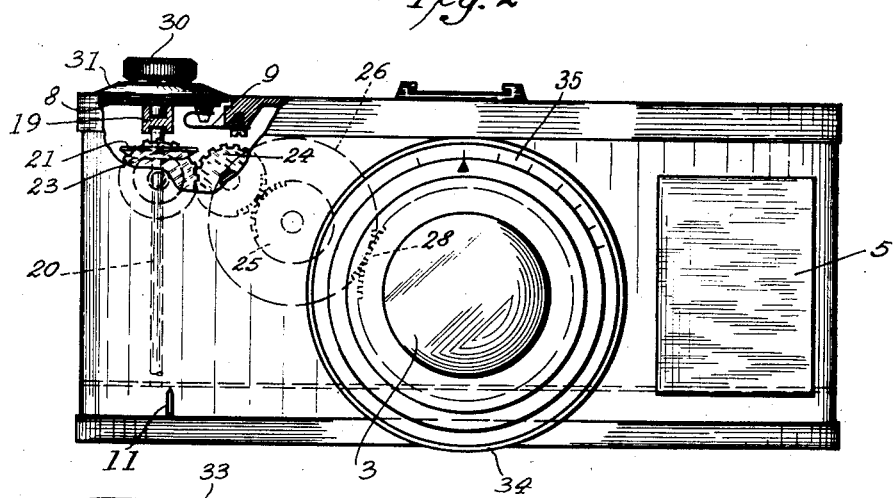
Fig. 2 is a front elevation of the camera and exposure meter, certain parts being shown in section.
Figure 3:
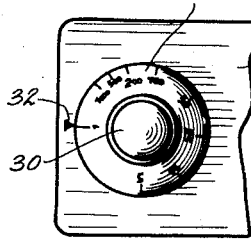
Fig. 3 is a top plan view of a detail of the adjusting means.

In the embodiment illustrated, the front wall of the camera has an opening in which the photosensitive cell 5 is located. The electric current generated upon illumination of the cell is carried through conductors, not shown, to the movable system of a galvanometer 6, the stationary part of which is formed by the magnet 7. A variable resistance 8, Fig. 2, may be interposed between the source of current 5 and the measuring instrument 6, and as in similar devices of this character, the variation of the resistance is effected by supporting the same movably relatively to a stationary contact member 9 in the circuit.

While in photographic exposure meters the movable system 6 of the galvanometer generally causes a pointer to move relatively to a scale, in the present invention the sensitiveness of the instrument is greatly enhanced by converting this galvanometer into a mirror galvanometer, and by providing a longer path for the beam of light reflected by the mirror than it normally would be in an instrument as compact and compendious as instruments of this character necessarily have to be.

For this purpose the indicating beam of light reflected from the mirror of the galvanometer is reflected, preferably a plurality of times, between the mirror 10 and the translucent observation window, so that this path is considerably longer than the actual distance between the mirror 10 and the translucent screen.

The front wall of the housing 1 is provided with a small or narrow slit 11 shown near the bottom and through which the light enters to strike a reflector 12 preferably in a fixed position in the interior of the housing. The light reflected by the mirror 12 is thrown upon another mirror or reflector 13 to be reflected thereby upon the galvanometer mirror 10.

For the purpose of producing a very sharp picture of the beam of light entering the slit 11 in the housing, means for condensing said beam may be provided between the point of entry and the movable reflector 10 of the galvanometer. By way of example a compound lens 14 adapted to produce a very sharp picture of the beam of light is shown interposed between the reflectors 12 and 13 in the embodiment illustrated. Owing to this multiple deflection, the location of the mirror 10 also need not be in alinement with the slit 11, so as to make the instrument very compact and narrow, without sacrificing the sensitiveness due to the mirror galvanometer.

Figure 4:
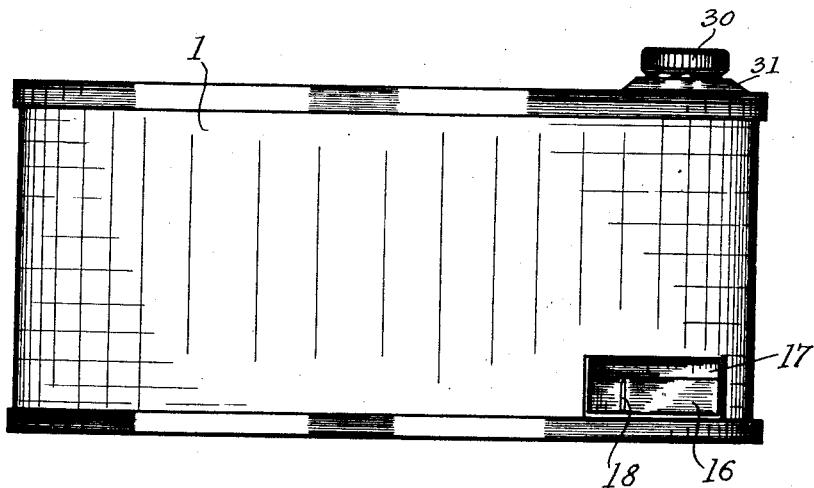
Fig. 4 is a rear elevation of the camera with the observation window for the indicator beam.
Figure 5:
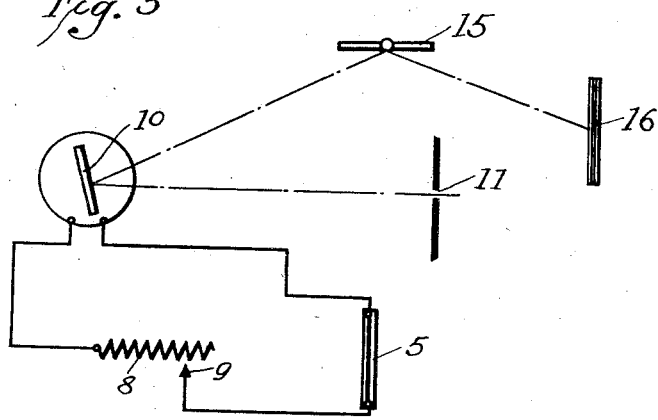
Fig. 5 is a simplified diagrammatical representation of the exposure meter and the optical equipment.

The beam of light reflected by the mirror 10 is not projected directly upon the translucent screen, but its path also is lengthened to produce a broad sweep over said screen. In the embodiment shown, the beam reflected from mirror 10 is directed toward the reflector 13 although it is obvious that in place of this reflector which had been used for the incident beam of light, another reflector might be positioned in the path of the reflected beam. The light is then reflected from mirror 13 to a reflector 15, from which last named reflecting means it is projected upon the translucent screen 16. This screen is preferably disposed in the rear wall of the camera, and as shown in Fig. 4, a plurality of markings 17 are provided thereon permitting the observer to read the position of the indicator beam 18 with respect to any of these indications.

One of the deflecting means is coupled with one of the elements for controlling the exposure conditions.

In the embodiment illustrated, the reflector 15 is mounted on a shaft 20, which is rotatable in the housing. The upper end of shaft 20 enters the bearing stud 19, which may be fixed in the housing. A bevel gear 21 on shaft 20 is in operative relation to the bevel gear 22, with which a train of spur gears 23, 24 and 25 is associated, the last named gear being fixedly connected with another gear 26 in mesh with the gear rim 28 on the ring 29, and this last named ring is connected with the diaphragm ring 4 of the camera.

The adjustment of the resistance 8 is effected by turning a knob 30 which is accessible from the outside of the housing and which has a bevelled base 31 adapted to be set selectively with respect to a fixed mark 32 also disposed on the housing. The bevelled disc 31 preferably carries indications of the shutter speed, and by rotation of the knob 30, therefore, the shutter may be set to the speed indicated for which purpose a mechanism, not illustrated herein, but well known by itself, may be used.

In the use of the device, the operator advisably selects through rotation of the knob 30 the exposure time which may depend upon the nature of the object, whether movable or stationary, and which also may be selected under consideration of the light conditions as estimated by the operator. Rotation of knob 30 not only adjusts the shutter to the desired speed, but also determines the value of the resistance 8 within the circuit of the galvanometer and photoelectric cell. If then the photoelectric cell 5 is exposed to the light reflected by the object, the current set up in the circuit of this cell will bring about a deflection of the movable system of the galvanometer, depending on the one hand upon the light condition, and on the other hand upon the resistance 8. The current imparts movement to the mirror 10, so that the beam 18 travels over the screen 16 at the rear face of the camera. This rear face is directed towards the operator, and hence the location of the beam is continuously under observation of the user. The translucent screen 16 has markings 17 which may indicate the stop to be used at the selected shutter speed. It is also feasible, however, to turn now the ring 34 which is connected with the diaphragm ring 4 and has a diaphragm aperture scale 35 thereon, in order to actuate the train of gears 26 to 21 inclusive, whereby a rotary movement of the adjustable reflector 15 is set up, thereby influencing the position of the beam on the face of the transparent screen.

This adjustment, preferably, is continued until the beam 18 reaches a predetermined position, as for instance, a zero or central position upon the screen. When this condition has been attained, the operator has selected the proper diaphragm for the speed which previously had been selected.

The invention, however, is not intended to be limited to the embodiment described and shown. It is possible for instance to effect positive setting of the second adjustable exposure control element, namely the diaphragm or stop, when the first exposure control element, namely the shutter, is set to a certain speed value. This could be accomplished by returning the indicator beam to a predetermined position, as for instance zero position, by turning a reflector. It could also be accomplished by having a second beam, or other indicator means, in lagging or leading cooperation with the indicator beam.

We claim:

1. A photographic exposure meter comprising a housing, a photoelectric cell fixedly secured to a wall of said housing, a galvanometer provided with a movable mirror indicator within said housing, the wall of the housing to which said photoelectric cell is secured being provided with a slit, a translucent screen in another wall of said housing, two reflecting members within the housing for reflecting the beam of light entering said casing through said slit onto said movable mirror indicator, one of said reflecting members being positioned to reflect the beam of light a second time, after said beam of light has been reflected by said mirror indicator, a third reflecting member within said housing for receiving the beam of light reflected from said mirror indicator onto said last named reflecting member and to reflect this beam of light onto said translucent screen, and manually operable means for adjusting said third reflecting member to direct the beam of light to a predetermined position on said translucent screen.

2. A photographic exposure meter comprising a housing, a photoelectric cell fixedly secured to a wall of said housing, a galvanometer provided with a movable mirror indicator within said housing, the wall of the housing to which said photoelectric cell is secured being provided with a slit, a translucent screen in another wall of said housing, two reflecting members within the housing for reflecting the beam of light entering said casing through said slit onto said movable mirror indicator, a beam concentrating objective between said two reflecting members, one of said reflecting members being positioned to reflect the beam of light a second time, after said beam of light has been reflected by said mirror indicator, a third reflecting member within said housing for receiving the beam of light reflected from said mirror indicator onto said last named reflecting member and to reflect this beam of light onto said translucent screen, and manually operable means for adjusting said third reflecting member to direct the beam of light to a predetermined position on said translucent screen.

3. A photographic exposure meter comprising a housing having a front wall, a rear wall and a top wall, a photoelectric cell on said front wall, a variable resistance and a mirror galvanometer within said housing and arranged in circuit with said photoelectric cell, said housing having a slit in its front wall and a translucent screen in its rear wall, means within said housing for reflecting the light beam entering through said slit onto the mirror of said galvanometer, means for reflecting the beam of light reflected by said mirror onto said translucent screen, manually operable means for adjusting said last named reflecting means, and a second manually operable means on said top wall for adjusting said variable resistance, said two manually operable means being provided for directing the beam of light to a predetermined position on said translucent screen.

4. A photographic exposure meter comprising a housing having a front wall, a rear wall and a top wall, a photoelectric cell on said front wall, a variable resistance and a mirror galvanometer within said housing and arranged in circuit with said photoelectric cell, said housing having a slit in its front wall and a translucent screen in its rear wall, means within said housing for reflecting the light beam entering through said slit onto the mirror of said galvanometer, means for reflecting the beam of light reflected by said mirror onto said translucent screen, manually operable means for adjusting said last named reflecting means, and a second manually operable means on said top wall for adjusting said variable resistance, said two manually operable means being provided for directing the beam of light to a predetermined position on said translucent screen, one of said manually operable means being associated with a scale indicating shutter speed values and the other manually operable means being associated with a scale indicating diaphragm aperture values to indicate a shutter speed-diaphragm aperture combination giving a correctly exposed negative when the beam of light has been adjusted to said predetermined position on said translucent scale.

5. A photographic exposure meter comprising a housing, a photoelectric cell fixedly secured to a wall of said housing, a variable resistance and a galvanometer provided with a movable mirror indicator within said housing and arranged in circuit with said photoelectric cell, the wall of the housing to which the photoelectric cell is secured being provided with a slit, a translucent screen in another wall of said housing, means within said housing for reflecting the light beam entering through said slit onto said mirror indicator, means for reflecting the beam of light reflected by said mirror indicator onto said translucent screen, manually operable means for adjusting said last named reflecting means, and a second manually operable means for adjusting said variable resistance, said two manually operable means being provided for directing the beam of light to a predetermined position on said translucent screen.

6. A photographic exposure meter comprising a housing, a photoelectric cell fixedly secured to a wall of said housing, a variable resistance and a galvanometer provided with a movable mirror indicator within said housing and arranged in circuit with said photoelectric cell, the wall of the housing to which the photoelectric cell is secured being provided with a slit, a translucent screen in another wall of said housing, means within said housing for reflecting the light beam entering through said slit onto said mirror indicator, means for reflecting the beam of light reflected by said mirror indicator onto said translucent screen, manually operable means for adjusting said last named reflecting means, and a second manually operable means for adjusting said variable resistance, said two manually operable means being provided for directing the beam of light to a predetermined position on said translucent screen, one of said manually operable means being associated with a scale indicating shutter speed values and the other manually operable means being associated with a scale indicating diaphragm aperture values to indicate a shutter speed-diaphragm aperture combination giving a correctly exposed negative when the beam of light has been adjusted to said predetermined position on said translucent scale.

7. A photographic exposure meter comprising a housing, a photoelectric cell fixedly secured to a wall of said housing, a variable resistance and a galvanometer provided with a movable mirror indicator within said housing and arranged in circuit with said photoelectric cell, the wall of the housing to which the photoelectric cell is secured being provided with a slit, a translucent screen in another wall of said housing, means within said housing for reflecting the light beam entering through said slit onto said mirror indicator, said means including two reflecting faces and a beam concentrating objective between the same, means for reflecting the beam of light reflected by said mirror indicator onto said translucent screen, manually operable means for adjusting said last named reflecting means, and a second manually operable means for adjusting said variable resistance, said two manually operable means being provided for directing the beam of light to a predetermined position on said translucent screen.

8. A photographic exposure meter comprising a housing having a front wall, a rear wall and a top wall, a photoelectric cell on said front wall, a variable resistance and a mirror galvanometer within said housing and arranged in circuit with said photoelectric cell, said housing having a slit in its front wall and a translucent screen in its rear wall, two reflecting members within the housing for reflecting the beam of light entering through said slit onto the mirror of said galvanometer, one of said reflectors being positioned to reflect the beam of light a second time after said beam has been reflected by said mirror, a third reflecting member within said housing for receiving the beam of light reflected from said mirror onto said last named reflecting member and to reflect this beam of light onto said translucent screen, manually operable means mounted on said front wall for adjusting said third reflecting member, and a second manually operable means mounted on said top wall for adjusting said variable resistance, said two manually operable means being provided for directing the beam of light to a predetermined position on said translucent screen.

9. A photographic exposure meter comprising a housing having a front wall, a rear wall and a top wall, a photoelectric cell on said front wall, a variable resistance and a mirror galvanometer within said housing and arranged in circuit with said photoelectric cell, said housing having a slit in its front wall and a translucent screen in its rear wall, two reflecting members within the housing for reflecting the beam of light entering through said slit onto the mirror of said galvanometer, one of said reflectors being positioned to reflect the beam of light a second time after said beam has been reflected by said mirror, a third reflecting member within said housing for receiving the beam of light reflected from said mirror onto said last named reflecting member and to reflect this beam of light onto said translucent screen, manually operable means mounted on said front wall for adjusting said third reflecting member, and a second manually operable means mounted on said top wall for adjusting said variable resistance, said two manually operable means being provided for directing the beam of light to a predetermined position on said translucent screen, one of said manually operable means being associated with a scale indicating shutter speed values and the other manually operable means being associated with a scale indicating diaphragm aperture values to indicate a shutter speed-diaphragm aperture combination giving a correctly exposed negative when the beam of light has been adjusted to said predetermined position on said translucent scale.

10. A photographic exposure meter comprising a housing, a photoelectric cell fixedly secured to a wall of said housing, a galvanometer provided with a movable mirror indicator within said housing, the wall of the housing to which said photoelectric cell is secured being provided with a slit, a translucent screen in another wall of said housing two reflecting members within the housing for reflecting the beam of light entering said casing through said slit onto said movable mirror indicator, a beam concentrating objective between said two reflecting members, a third reflecting member within said housing for receiving the beam of light reflected from said mirror indicator and to reflect this beam of light onto said translucent screen, and manually operable means for adjusting said third reflecting member to direct the beam of light to a predetermined position on said translucent screen.

11. A photographic exposure meter comprising a housing, a photoelectric cell fixedly secured to a wall of said housing, a galvanometer provided with a movable mirror indicator within said housing, the wall of the housing to which said photoelectric cell is secured being provided with a slit, a translucent screen in another wall of said housing, two reflecting members within the housing for reflecting the beam of light entering said casing through said slit onto said movable mirror indicator, one of said reflecting members being positioned to reflect the beam of light a second time, after said beam of light has been reflected by said mirror indicator, and a third reflecting member within said housing for receiving the beam of light reflected from said mirror indicator onto said last named reflecting member and to reflect this beam of light onto said translucent screen, said translucent screen having marking thereon indicating diaphragm aperture values.

12. A photographic exposure meter comprising a housing having a front wall, a rear wall and a top wall, a photoelectric cell on said front wall, a variable resistance and a mirror galvanometer within said housing and arranged in circuit with said photoelectric cell said housing having a slit in its front wall and a translucent screen with a scale in its rear wall, two reflecting members within said housing for reflecting the light beam entering through said slit onto the mirror of said galvanometer, one of said reflecting members being positioned to reflect the beam of light a second time after said beam of light has been reflected by the mirror of said galvanometer, a third reflecting member within said housing for receiving the beam of light after it has been twice reflected by one of said two first named reflecting members and reflecting it onto said translucent screen, and a manually operable member on said top wall for adjusting said variable resistance, said manually operable member being provided with a scale indicating shutter speed values, while the scale on said translucent screen indicates diaphragm aperture values.

HANS SAUER.
PAUL GÖRLICH.